United States Patent [19]
Hartsell et al.

[11] Patent Number: 5,453,628
[45] Date of Patent: Sep. 26, 1995

[54] MICROELECTRONIC DIAMOND CAPACITIVE TRANSDUCER

[75] Inventors: Michelle L. Hartsell, Cary; Scott R. Sahaida; Brian R. Stoner, both of Raleigh; Glenn J. Tessmer, Cary, all of N.C.

[73] Assignee: Kobe Steel USA, Inc., Research Triangle Park, N.C.

[21] Appl. No.: 322,064

[22] Filed: Oct. 12, 1994

[51] Int. Cl.⁶ .................... H01L 29/84; H01L 29/96
[52] U.S. Cl. .................. 257/76; 257/77; 257/417; 257/419; 73/718; 73/721; 73/724; 73/727; 338/5
[58] Field of Search .................. 257/76, 77, 417, 257/418, 419, 469; 73/720, 721, 718, 724, 727; 338/5

[56] References Cited

U.S. PATENT DOCUMENTS

| | | | |
|---|---|---|---|
| 4,706,100 | 11/1987 | Tufte | 357/16 |
| 4,768,011 | 8/1988 | Hattori et al. | 338/5 |
| 5,285,084 | 2/1994 | von Windheim et al. | 257/77 |
| 5,362,975 | 11/1994 | von Windheim et al. | 257/76 X |
| 5,365,789 | 11/1994 | Totterdell et al. | 73/721 |
| 5,391,914 | 2/1995 | Sullivan et al. | 257/77 |

FOREIGN PATENT DOCUMENTS

| | | |
|---|---|---|
| 62-145780 | 6/1987 | Japan . |
| 62-147781 | 7/1987 | Japan . |
| 62-148829 | 7/1987 | Japan . |
| 62-148830 | 7/1987 | Japan . |
| 2-268593 | 11/1990 | Japan . |
| 3-63538 | 3/1991 | Japan . |
| 5-296864 | 11/1993 | Japan . |
| 5-326985 | 12/1993 | Japan . |

OTHER PUBLICATIONS

Clark et al., Pressure Sensitivity in Anisotropically Etched Thin–Diaphragm Pressure Sensors, *IEEE Transactions on Electron Devices*, vol. Ed–26, No. 12 (1979), pp. 1887–1996.

Primary Examiner—William Mintel
Attorney, Agent, or Firm—Bell, Seltzer, Park & Gibson

[57] ABSTRACT

A capacitive transducer includes a first electrically conductive layer, and a diamond diaphragm mounted opposite the first electrically conductive Layer so as to be moveable relative to the first electrically conductive layer. The first electrically conductive layer defines a first plate for the transducer, while the diaphragm defines the second plate for the transducer. In one embodiment of the transducer, the diamond layer is degeneratively doped providing the second plate. The microelectronic capacitive transducer preferably also includes an insulating layer on a face of the diamond layer adjacent the electrically conductive layer defining an overpressure stop for the transducer. The transducer includes absolute or differential pressure sensing embodiments. The microelectronic capacitive transducer may also be configured as an actuator. The diamond layer may be highly oriented diamond including semiconductor devices formed therein to provide signal conditioning. A fabrication method is also disclosed.

34 Claims, 3 Drawing Sheets

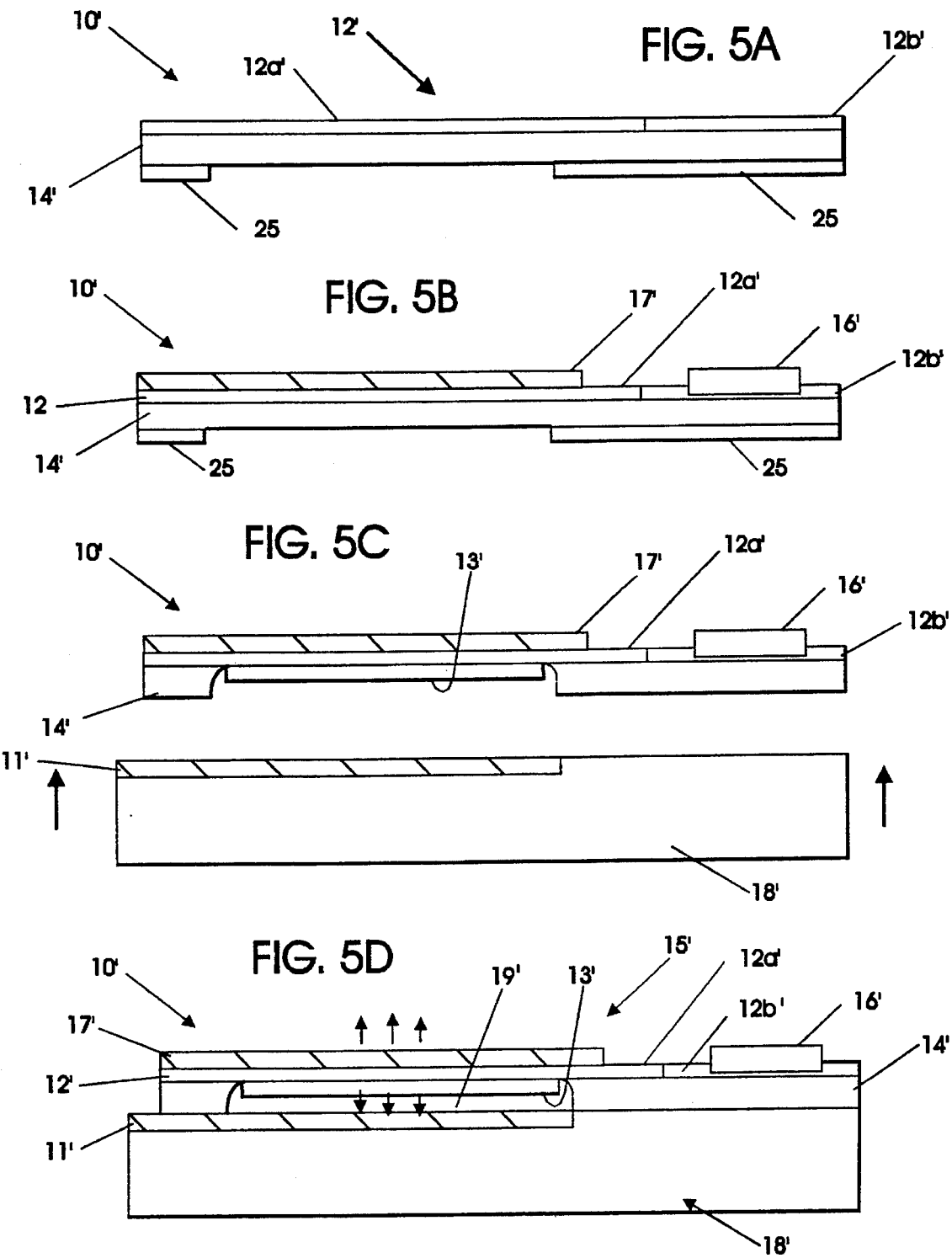

MICROELECTRONIC DIAMOND CAPACITIVE TRANSDUCER

FIELD OF THE INVENTION

This invention relates to microelectronics and, more particularly, to a microelectronic capacitive transducer and method for making the transducer.

BACKGROUND OF THE INVENTION

A transducer may be broadly defined as a device which converts one form of input energy to another form of output energy. A typical microelectronic capacitive transducer includes a pair of electrically conductive plates arranged in spaced apart relation. When configured to convert electrical energy into mechanical energy, the transducer operation is based upon the principle of electrostatic attraction caused by electrically charging the opposing plates. For example, when electrical energy is input to the transducer in the form of a voltage applied between the plates, the plates are drawn together by electrostatic attraction. If the plates are free to move together, the input electrical energy is converted into mechanical energy.

The plates of an electronic transducer may also be used to generate an electrical signal from an input of mechanical energy. For example, the plates may first be charged by an applied electrical voltage. The plates may then be disconnected from the charging source and mechanical energy used to move the plates either closer together or farther apart. As the distance between the plates is changed, the voltage between the plates changes thereby converting the mechanical energy into an electrical signal.

Accordingly, a microelectronic capacitive transducer may be used as an actuator or a sensor. As an actuator, the transducer may convert electrical energy into mechanical motion. As a pressure sensor, the transducer may convert mechanical motion into an electrical signal responsive to pressure changes.

Microelectronic capacitive transducers or sensors are known which generate an electrical signal responsive to a pressure difference between two fluids. If at least one of the two plates is a diaphragm and may deflect or otherwise move, a difference in the pressure exerted on the two sides of the diaphragm will cause it to move relative to the other plate as disclosed, for example, in an article by Clark and Wise entitled "Pressure Sensitivity in Anisotropically Etched Thin-Diaphragm Pressure Sensors," IEEE Transactions on Electron Devices, Vol. ED-26, No. 12, December 1979. The article discloses a differential capacitive pressure sensor including a metallized thin silicon diaphragm and a second plate provided by a silicon support chip. A reference cavity separates the two plates, and this cavity has an inlet to allow access to a first fluid providing a reference pressure. The face of the silicon diaphragm opposite the reference cavity is exposed to the sample fluid providing an external pressure. Accordingly, the silicon diaphragm flexes responsive to the difference between the external pressure and the reference pressure.

The plates of the capacitive transducer of Clark, however, may be subject to shorting in an overpressure condition. An overpressure short may be addressed by providing an insulating layer or overpressure stop. See, for example, Cho, Najafi and Wise, "Secondary Sensitivities and Stability of Ultrasensitive Silicon Pressure Sensors," IEEE, 1990. The overpressure stop of Cho is a layer of an insulating glass on the face of the silicon diaphragm adjacent the reference cavity. Because the two adjacent layers are not homogeneous, however, flexing may generate internal stresses in the materials of the diaphragm. The inhomogeneity also results in a thermal expansion mismatch between the materials.

Both of the above mentioned capacitive transducers are also limited by the material characteristics of silicon which has a relatively low energy bandgap of 1.12 eV and other shortcomings, particularly for high temperature applications. Diamond, in contrast, is a preferred material for many microelectronic devices because it has semiconductor properties that are better than silicon, germanium or gallium arsenide. Diamond also provides a higher energy bandgap, a higher breakdown voltage and a higher saturation velocity than these traditional semiconductor materials.

These properties of diamond yield a substantial increase in projected cutoff frequency and maximum operating voltage compared to devices fabricated using silicon, germanium or gallium arsenide. Silicon is typically not used at temperatures higher than about 200° C. and gallium arsenide is not typically used above 300° C. These temperature limitations are caused, in part, because of the relatively small energy bandgaps for silicon (1.12 eV at ambient temperature) and gallium arsenide (1.42 eV at ambient temperature). Diamond, in contrast, has a large bandgap of 5.47 eV at ambient temperature, and is thermally stable up to about 1200° C.

Diamond has the highest thermal conductivity of any solid at room temperature and exhibits good thermal conductivity over a wide temperature range. The high thermal conductivity of diamond may be advantageously used to remove waste heat. In addition, diamond has a smaller neutron cross-section which reduces its degradation in radioactive environments, i.e., diamond is a "radiation-hard" material. In addition, diamond has a higher gauge factor than conventional semiconductors.

Because of the advantages of diamond as a material for microelectronic devices, there is an interest in the growth and use of diamond for microelectronic transducers. A piezoresistive diamond pressure sensor is disclosed in Japanese Patent No. 03-063538 to Uesugi. This pressure sensor includes a piezoresistive diamond diaphragm, and a resistance detecting circuit located on the substrate rather than the diamond film. Accordingly, the signal processing circuitry fails to take advantage of diamond.

A microelectronic piezoelectric sensor formed in high energy bandgap semiconductors is disclosed, for example, in U.S. Pat. No. 4,706,100 to Tufte. This patent discloses a piezoresistive pressure sensor with a diaphragm including a layer of a high energy bandgap semiconductor which is epitaxially grown on silicon. The patent discloses that suitable large bandgap semiconductors have a suitable energy band structure to exhibit large piezoresistive effects and which can be grown on silicon in a good quality heteroepitaxial layer. Disclosed examples include p-type GaAs (1.4 eV bandgap), p-type $Al_xGa_{1-x}As$ alloys, and n- or p-type AlAs which are lattice matched to GaAs and allow bandgaps up to 2.1 eV and β-SiC which has a bandgap of 2.7 eV. The patent also discloses integration of read-out electronics into the large bandgap semiconductor film.

Conventional semiconductor capacitive transducers are limited in temperature range and the ability to withstand harsh environments. Because of the advantages of diamond as a material for microelectronic devices, there is an interest in the growth and use of diamond for microelectronic transducers and particularly for sensors. Diamond pressure sensors, which may have several of the advantages of diamond, have only been described including piezoelectric resistors formed in a diamond layer.

SUMMARY OF THE INVENTION

In view of the foregoing background, it is therefore an object of the present invention to provide a microelectronic capacitive transducer capable of operating at high temperatures or other severe environments.

It is another object of the present invention to provide a microelectronic capacitive transducer capable of withstanding overpressure conditions.

It is yet another object of the invention to provide a microelectronic transducer having signal conditioning circuitry operating in close proximity to the opposing capacitive plates.

These and other objects, features, and advantages according to the present invention are provided by a capacitive transducer including a first electrically conductive layer, and a diamond diaphragm mounted opposite the first electrically conductive layer so as to be moveable relative to the first electrically conductive layer. The first electrically conductive layer defines a first plate for the transducer, while the diaphragm defines the second plate for the transducer.

In one embodiment of the transducer, the diamond layer is degeneratively doped, that is, relatively highly doped so that the diamond layer is electrically conducting. In this embodiment the degeneratively doped diamond layer defines the second plate for the capacitive transducer. An electrically conducting layer, such as metal, may also be provided on the degeneratively doped diamond layer to form a contact therewith. Alternately, the diamond layer may be semiconducting or insulating in which case an electrically conducting layer is provided on the diamond layer to serve as the second plate.

The microelectronic capacitive transducer preferably also includes an insulating layer on a face of the diamond layer adjacent the electrically conductive layer. The insulating layer defines an overpressure stop to prevent electrical shorting and to prevent damage to the diamond layer as may result from excessive deflection caused by an overpressure condition. The overpressure stop is preferably insulating diamond so that internal stresses are minimized during thermal cycling and as the diaphragm undergoes deflection.

In one embodiment of the capacitive transducer, the first electrically conductive layer is preferably a metal layer on a suitable substrate, such as borosilicate glass. The diamond layer is preferably separated from the metallized substrate by the mounting means thereby forming a cavity between the metallized substrate and diaphragm. The mounting means is preferably provided by a silicon layer having an opening therethrough, and positioned between the diamond layer and the metallized substrate.

The transducer according to the invention and including diamond operates with the advantages provided by diamond. The transducer is resistive to corrosion, is radiation hard, and is capable of high temperature operation. Because of these properties, the transducer may be fabricated without encapsulation, thereby reducing the size and weight of the device.

The microelectronic capacitive transducer according to another aspect of the invention further includes another diamond layer or portion laterally adjacent the diamond diaphragm layer and integrally formed therewith. The overall diamond layer may comprise polycrystalline diamond or single crystal diamond. However, highly oriented diamond and single crystal diamond, in particular, are capable of supporting high quality active and passive electronic devices such as field effect transistors (FETs), to thereby provide signal conditioning for the transducer. High quality, highly oriented diamond may be formed on a relatively inexpensive nondiamond substrate and over relatively large areas. Accordingly, the diamond layer may preferably be highly oriented diamond.

The transducer also preferably includes signal conditioning means formed in the highly oriented semiconducting diamond for generating a conditioned output signal responsive to movement of the diaphragm relative to the electrically conductive layer. The signal conditioning means may provide amplification, signal processing, or temperature compensation. Yet a further advantage of the present invention is that the signal conditioning means may be positioned in close proximity to the capacitive plates.

The capacitive transducer may be readily configured and operated as a pressure sensor. In one embodiment, the electrically conductive plates are charged by applying a direct current voltage. After removing the charging source, the voltage between the two charged conductive plates varies in response to changes in the separation distance between the two conductive layers. Accordingly, the transducer produces an electrical signal related to the fluid pressure applied to the diaphragm. In another configuration, an AC signal is applied across the two plates, and the variation in the impedance is measured as the separation distance changes in response to pressure changes.

As a pressure sensor, the transducer can be fabricated as either an absolute or differential pressure sensor. The absolute pressure sensor is fabricated so that the cavity between the two plates is sealed. In this embodiment, the sensor measures the pressure of the external fluid relative to a reference pressure within the sealed cavity.

In a differential pressure sensing embodiment, the cavity is vented to a second fluid. Preferably this vent is an opening through the substrate and the metal layer on the substrate. Accordingly, the diamond diaphragm is exposed to the pressure of the first fluid on one face and the pressure of the second fluid on the opposite face. The diaphragm deflects responsive to the difference of the two pressures thereby operating as a differential pressure sensor.

The capacitive transducer may also be configured as an actuator. In this configuration, the transducer is arranged such that the diamond layer deflects responsive to an applied electrical signal. To provide a useable force, a plurality of such actuators may be joined together to define an array.

Another aspect of the present invention is a method of fabricating a microelectronic capacitive transducer. The method preferably comprises the steps of providing a first electrically conductive layer, and mounting a diaphragm opposite the first electrically conductive layer so as to be moveable relative to the first electrically conductive layer, wherein the diaphragm comprises a first diamond layer. For one embodiment, the method preferably includes the step of degeneratively doping the diamond layer to a dopant concentration of greater than about $10^{19}$ cm$^{-3}$ so that the diamond layer is electrically conductive.

The method preferably includes the step of forming a second diamond insulating layer on a face of the first diamond layer adjacent the first electrically conductive layer to define an overpressure stop. In addition, the method also preferably includes forming a third diamond layer laterally adjacent the first diamond layer and integrally formed therewith, the third diamond layer being semiconducting; and forming signal conditioning means in the third semiconducting diamond layer. The first and third diamond layers are preferably formed of highly oriented diamond.

BRIEF DESCRIPTION OF THE DRAWINGS

FIGS. 5A–5D are schematic cross-sectional views illustrating intermediate structures during fabrication of the microelectronic capacitive differential pressure sensor according to the present invention.

DETAILED DESCRIPTION OF PREFERRED EMBODIMENTS

Figure 1:
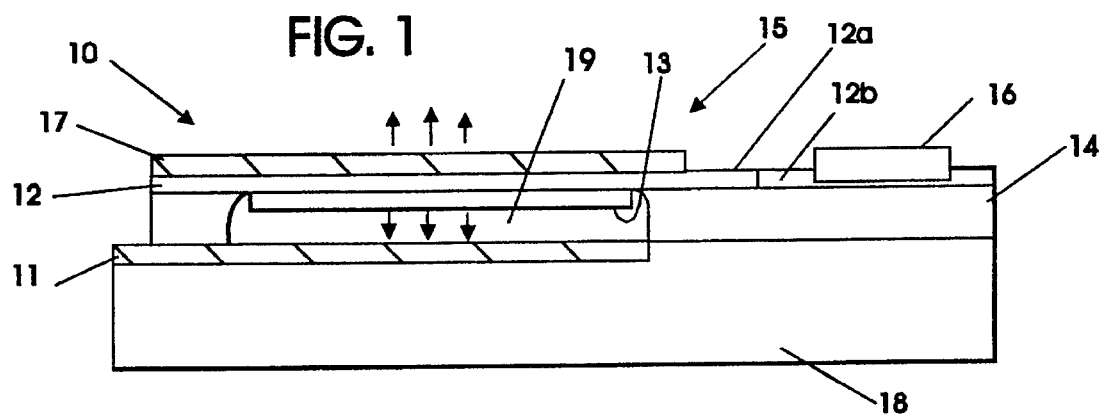
FIG. 1 is a schematic cross-sectional view of a microelectronic capacitive absolute pressure sensor according to the invention.

The present invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout and prime notation is used to indicate similar elements in alternate embodiments.

Figure 2:
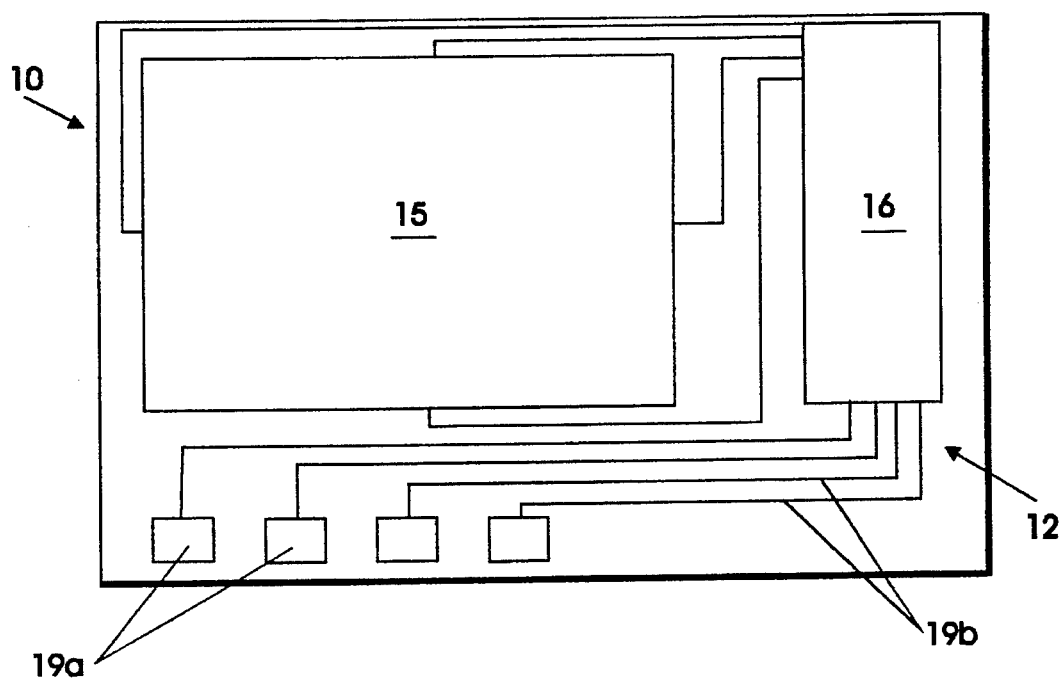
FIG. 2 is a schematic plan view of the microelectronic capacitive transducer as shown in FIG. 1.

Referring now to FIGS. 1 and 2, a first embodiment of the microelectronic capacitive transducer configured as an absolute capacitive pressure sensor 10 is shown. The sensor 10 includes a first electrically conductive layer 11 on a substrate 18. The substrate 18 may be a borosilicate glass, for example. The first electrically conductive layer 11 is preferably a metal layer formed on the substrate 18 using conventional semiconductor metallization techniques as would be readily appreciated by those skilled in the art.

A diaphragm 15 is mounted adjacent the first electrically conductive layer 11 in spaced relation therefrom and defining a cavity 19 therebetween. The first electrically conductive layer 11 defines a first plate for the capacitive sensor 10. In the illustrated embodiment of the capacitive absolute pressure sensor 10, the cavity 19 is sealed.

The diaphragm 15 comprises a first diamond layer or portion 12a extending across the cavity 19. In one embodiment, the diamond layer 12a is degeneratively doped to greater than about $10^{19}$ cm$^{-3}$ with a suitable dopant, such as boron, so that the diamond layer is electrically conducting. Accordingly, the diamond layer 12a serves as the second plate of the capacitive sensor 10.

The diaphragm 15 is mounted in spaced apart relation from the electrically conductive layer 11 so that the diaphragm may be deflected or is otherwise moveable relative to the first electrically conducting layer. The mounting means is illustratively provided by an insulating layer 14, such as may be readily formed from a selectively etched silicon wafer which is, in turn, bonded to the substrate 18, such as by an anodic bond, or by a sealing glass. Stated in different terms, the mounting means is provided by an insulating layer 14 having an opening extending therethrough defining the sidewalls for the cavity 19.

A fluid, such as a gas or liquid, exposed to the face of the diaphragm 15 opposite the cavity 19 causes the diaphragm to deflect responsive to the external pressure relative to a predetermined reference pressure within the sealed volume of the cavity. Accordingly, the external pressure causes a variation in the separation distance between the two plates of the sensor 10. In one configuration of the sensor 10, if an electrical charge is applied to the two plates, the variation in the separation distance will cause the voltage across the two plates to vary responsive to external pressure changes.

In a second configuration of the sensor 10, a signal having a predetermined frequency may be applied across the two conductive layers, and the impedance detected. As the distance between the conductive layers changes, the impedance also changes thereby providing a signal indicating the pressure.

The microelectronic capacitive pressure sensor 10 also illustratively includes an insulating layer 13 defining an overpressure stop. Preferably the insulating layer 13 is provided by a second diamond layer comprising intrinsic or insulating diamond. In an overpressure condition, it may be possible for the degeneratively doped diamond layer 12 of the diaphragm 15 to deflect toward and touch the first conductive layer 11. Without the insulating layer 13 serving as an overpressure stop, an electrical short would occur causing the sensor 10 to give an erroneous reading. In addition, without the overpressure stop, a large range of diaphragm deflection may damage the diaphragm.

Since the diamond layer 12a and the overpressure stop insulating layer 13 deflect together, it is desirable to reduce material stress that may occur between these layers. This stress is reduced according to one aspect of the invention because the insulating layer 13 and the diamond layer 12a are both preferably formed of diamond. This reduces stresses during normal deflection, as well as reduces stresses which may result from thermal cycling as compared to a transducer wherein two different materials having different coefficients of thermal expansion are used.

The pressure sensor 10 further includes a third diamond layer 12b laterally adjacent the first diamond layer 12a and preferably integrally formed therewith defining an overall diamond layer 12. The second diamond layer 12b is preferably semiconducting diamond within which signal conditioning means 16 may be readily formed. The signal conditioning means 16 preferably includes one or more electronic devices, such as a field effect transistor or passive components, as would be readily understood by those skilled in the art. The signal conditioning means 16 may provide amplification, signal processing, or temperature compensation. As shown schematically in FIG. 2, the capacitive pressure sensor 10 may also include contact pads 19a for external connections, and conductive lines 19b interconnecting the various components.

Figure 3:
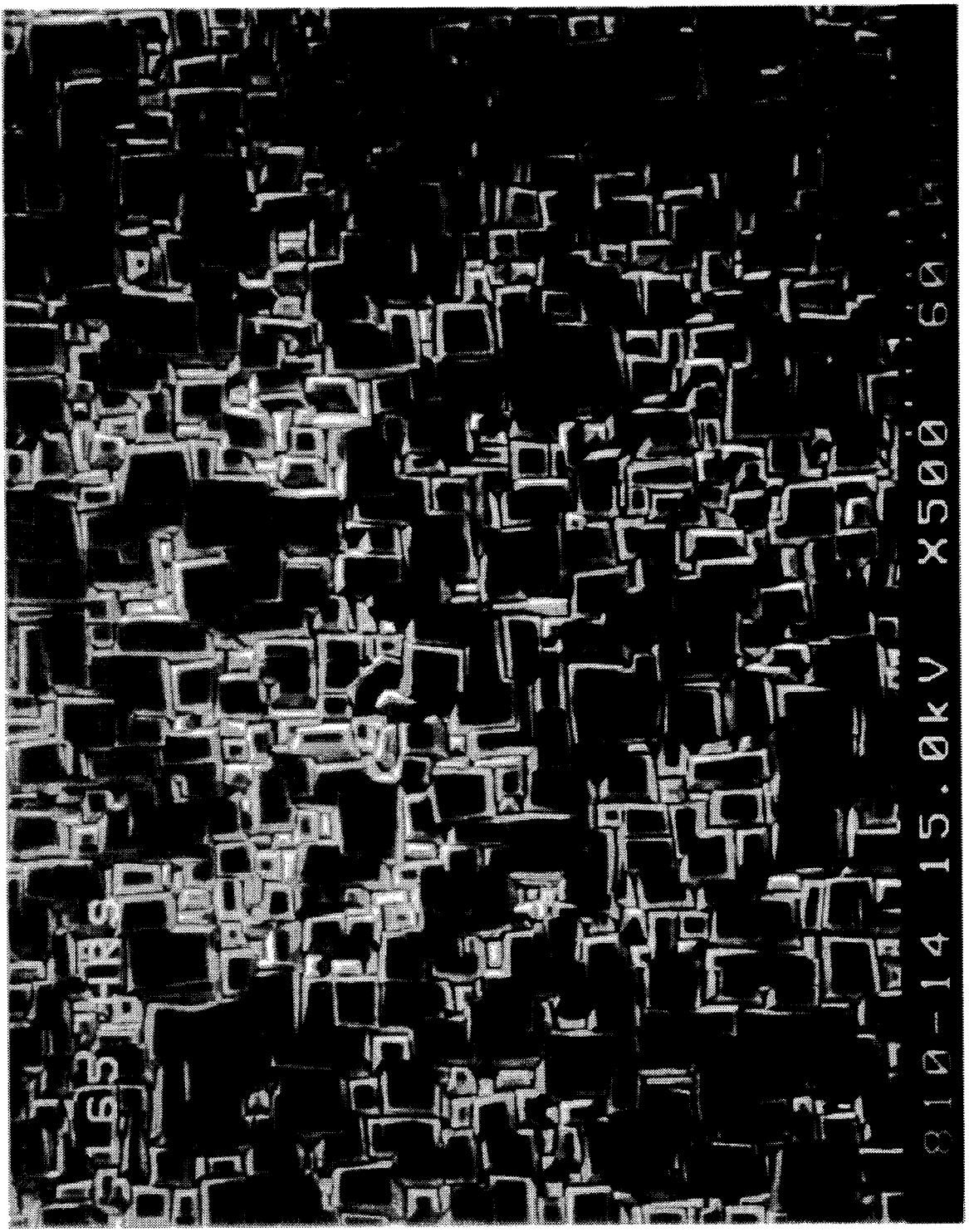
FIG. 3 is a photomicrograph of highly oriented diamond that may be used in the microelectronic capacitive transducer according to the invention.

The diamond layer 12 may be polycrystalline diamond, highly oriented diamond, or single crystal diamond. A preferred sensor 10 includes a highly oriented diamond film or a single crystal diamond film so that high quality devices may be made for the signal conditioning means 16. The transducer 10 most preferably includes a highly oriented diamond film as illustrated in the photomicrograph of FIG. 3. The highly oriented diamond film allows the fabrication of high quality electronic devices at a lower cost than single crystal diamond. The highly oriented diamond layer is more fully described in copending U.S. Patent applications Ser. No. 08/166,408, filed on Jan. 13, 1993 entitled Electrochemical Cell Having Diamond Electrode And Methods For Making Same and Ser. No. 08/035,643, filed on Mar. 23, 1993 entitled Microelectronic Structures on a Nondiamond Substrate and Associated Fabrication Methods, both assigned to the assignee of the present invention, and the entire disclosures of both of which are hereby incorporated herein by reference.

The highly oriented diamond layer includes parallel exposed faces that are also rotationally aligned thereby permitting grain boundaries to substantially disappear with continued diamond growth. The highly oriented diamond layer includes a plurality of side-by-side columnar single crystal diamond grains extending outwardly from a nondiamond wafer. Substantially all of the columnar single crystal diamond grains are preferably oriented with a tilt and azimuthal misorientation of less than about 8°, and more preferably, less than about 5° relative to the single crystal nondiamond wafer. The diamond nucleation site density, or concentration is also relatively high, that is, greater than about $10^4/cm^2$ and, more preferably, greater than about $10^5/cm^2$.

The method for making the highly oriented diamond layer includes carburizing the wafer surface, nucleating the carburized wafer, and growing diamond onto the nucleated wafer to favor growth of the (100)-oriented face. In addition, a carbide interfacial layer is preferably formed between the highly oriented diamond layer and the nondiamond substrate.

Nucleating the carburized wafer face preferably includes exposing the substrate face to a carbon containing plasma while electrically biasing another diamond layer adjacent the substrate face and also exposed to the plasma. The electrical biasing is preferably carried out at a peak absolute value of not less than about 250 volts negative with respect to ground. The electrical bias supplied may be pure DC, pulsed DC, alternating current (AC 50 or 60 Hz), or radio frequency (RF).

Without wishing to be bound thereto, applicants theorize that the adjacent diamond layer contributes to the enhancement of diamond nucleation by either of two mechanisms. First, it is theorized that the diamond is chemically transported from the adjacent diamond film to the substrate. In other words, it is possible that the diamond is being moved from the diamond film adjacent the substrate face via an etching and deposition process. A second theory is that increased gas phase dissociation is caused by electron emission from the diamond film and that a higher concentration of dissociated hydrocarbons are being created by this electron dissociation process.

Exposing both the nondiamond substrate and the adjacent diamond layer to the carbon-containing plasma preferably includes exposing both to the carbon-containing plasma having an atomic percentage of carbon of not more than about 0.3 atomic percent, such as provided by a methane gas plasma mixture having a percentage of methane of not more than about 5 percent by weight. The face of the substrate may also preferably be optically monitored and the electrical biasing discontinued responsive to a change in the substrate indicative of the start of growth of a diamond film on the substrate. For example, laser reflection interferometry or optical pyrometry may be used to monitor the face of the substrate. Then, diamond is preferably deposited onto the substrate while controlling processing conditions to favor growth of diamond having a (100)-oriented outer face.

Figure 4:
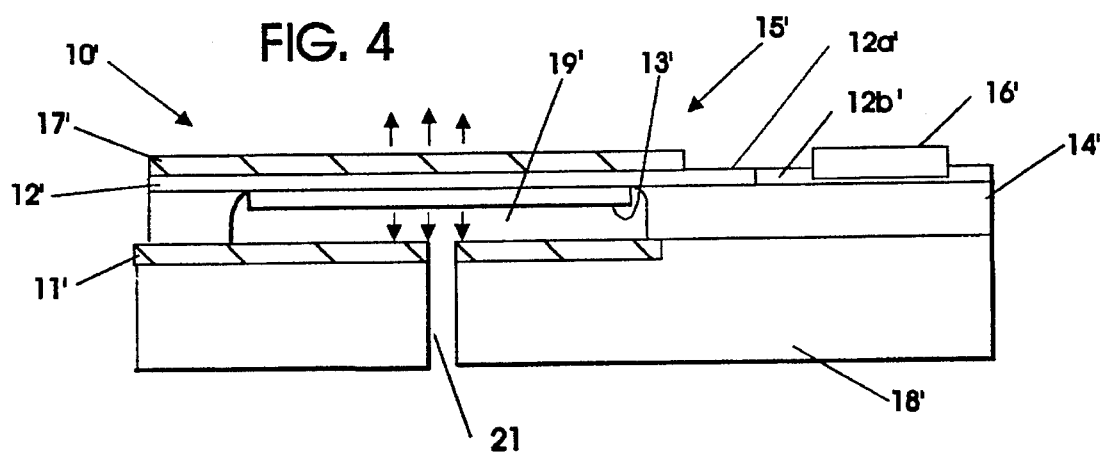
FIG. 4 is a schematic cross-sectional view of a microelectronic capacitive differential pressure sensor according to the invention.

Referring now to FIG. 4, a differential pressure sensor 10' according to the invention is shown. The differential pressure sensor 10' includes a vented cavity 19' in contrast to the absolute pressure sensor 10 described above. The differential sensor 10' includes an opening 21 which extends through the substrate 18' and first conductive layer 11' into the cavity 19'. Accordingly, differential pressure sensing is achieved wherein deflection of the diaphragm is effected by a pressure difference between opposing faces of the diaphragm 15'. The other elements of the differential sensor 10' are indicated by prime notation and need no further description as they are similar to those described with reference to the absolute pressure sensor 10.

Referring now to FIGS. 5A–5G, there is shown a process for fabricating a microelectronic capacitive transducer, such as the differential pressure sensor 10' shown in FIG. 4. As shown in FIG. 5A, a diamond layer 12' is formed on a face of an insulating layer 14' as may be readily provided by a silicon wafer. In addition, a degeneratively doped diamond layer 12a and a semiconducting diamond layer 12b may be formed on the insulating layer 14'. As would be readily understood by those having skill in the art, an intrinsic or insulating diamond region, not shown, may first be formed on the insulating layer 14'. A mask layer 25, such as of silicon nitride, is selectively formed on the opposite face of the insulating layer 14'.

As illustrated in FIG. 5B, the signal conditioning means 16 may be formed in semiconducting diamond layer 12b as would be readily understood by those skilled in the art. In addition, the electrically conductive metal layer 17' may also be formed on the first diamond layer 12a.

The insulating layer 14' may be etched and the insulating diamond layer 13' formed on the diamond layer 12a' producing the intermediate structure illustrated in FIG. 5C. As also illustrated in FIGS. 5C–5D, a substrate 18' having a metallized layer 11' may be mounted to the etched insulating layer 14'. The mounting may be performed by anodic bonding or the use of a sealing glass as would be readily understood by those skilled in the art. An opening 21 may be provided through the substrate 18' and the metal layer 11' to vent the cavity 19' thereby forming the sensor 10' as shown in FIG. 4.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A microelectronic capacitive transducer comprising:

a first electrically conductive layer;

a diaphragm positioned opposite said first electrically conductive layer, said diaphragm comprising a first diamond layer; and mounting means for mounting said diaphragm so as to be moveable relative to said first electrically conductive layer and defining a cavity therebetween.

2. A microelectronic capacitive transducer according to claim 1 wherein said first diamond layer is degeneratively doped.

3. A microelectronic capacitive transducer according to claim 1 wherein said diaphragm further comprises a second electrically conductive layer on said first diamond layer.

4. A microelectronic capacitive transducer according to claim 1 further comprising an insulating layer on a face of said first diamond layer adjacent said first electrically conductive layer and defining an overpressure stop.

5. A microelectronic capacitive transducer according to claim 4 wherein said insulating layer comprises a second diamond layer.

6. A microelectronic capacitive transducer according to claim 1 further comprising a third diamond layer laterally adjacent said first diamond layer and integrally formed therewith, wherein said third diamond layer is semiconducting, and further comprising signal conditioning means formed in said third semiconducting diamond layer for generating an output signal responsive to movement of said diaphragm relative to said first electrically conductive layer.

7. A microelectronic capacitive transducer according to claim 6 wherein said first and third diamond layers comprise highly oriented diamond.

8. A microelectronic capacitive transducer according to claim 6 wherein said signal conditioning means comprises temperature compensation means for generating an output signal substantially independent of ambient temperature variation.

9. A microelectronic capacitive transducer according to claim 1 wherein said first electrically conductive layer, said diaphragm, and said mounting means define a sealed cavity so that the capacitive transducer operates as an absolute pressure sensor.

10. A microelectronic capacitive transducer according to claim 1 further comprising a substrate positioned on a face of said first electrically conducting layer opposite said diaphragm, and wherein said substrate and said first electrically conductive layer have respective aligned openings extending therethrough to define a vented cavity so that the capacitive transducer operates as a differential pressure sensor.

11. A microelectronic capacitive transducer according to claim 1 wherein said mounting means comprises an insulating layer having an opening therethrough thereby defining sidewalls of the cavity.

12. A microelectronic capacitive transducer comprising:
a first electrically conductive layer;
a diaphragm positioned opposite said first electrically conductive layer, said diaphragm comprising a first diamond layer;
mounting means for mounting said diaphragm so as to be moveable relative to said first electrically conductive layer and defining a cavity therebetween; and
a second diamond layer on a face of said first diamond layer adjacent said first electrically conductive layer thereby defining an overpressure stop.

13. A microelectronic capacitive transducer according to claim 12 wherein said first diamond layer is degeneratively doped.

14. A microelectronic capacitive transducer according to claim 12 wherein said diaphragm further comprises a second electrically conductive layer on said first diamond layer.

15. A microelectronic capacitive transducer according to claim 12 further comprising a third diamond layer laterally adjacent said first diamond layer and integrally formed therewith, wherein said third diamond layer is semiconducting, and further comprising signal conditioning means formed in said third semiconducting diamond layer for generating an output signal responsive to movement of said diaphragm relative to said first electrically conductive layer.

16. A microelectronic capacitive transducer according to claim 15 wherein said first and third diamond layers comprise highly oriented diamond.

17. A microelectronic capacitive transducer according to claim 12 wherein said first electrically conductive layer, said diaphragm, and said mounting means define a sealed cavity so that the capacitive transducer operates as an absolute pressure sensor.

18. A microelectronic capacitive transducer according to claim 12 further comprising a substrate positioned on a face of said first electrically conducting layer opposite said diaphragm, and wherein said substrate and said first electrically conductive layer have respective aligned openings extending therethrough to define a vented cavity so that the capacitive transducer operates as a differential pressure sensor.

19. A microelectronic capacitive transducer comprising:
a first electrically conductive layer;
a diaphragm positioned opposite said first electrically conductive layer, said diaphragm comprising a first highly oriented diamond layer;
mounting means for mounting said diaphragm so as to be moveable relative to said first electrically conductive layer and defining a cavity therebetween;
a second highly oriented diamond layer laterally adjacent said first highly oriented diamond layer and integrally formed therewith; and
signal conditioning means formed in said second highly oriented diamond layer for generating an output signal responsive to movement of said diaphragm relative to said first electrically conductive layer.

20. A microelectronic capacitive transducer according to claim 19 wherein said first highly oriented diamond layer is degeneratively doped.

21. A microelectronic capacitive transducer according to claim 19 wherein said diaphragm further comprises a second electrically conductive layer on said first highly oriented diamond layer.

22. A microelectronic capacitive transducer according to claim 19 further comprising an insulating layer on a face of said first highly oriented diamond layer adjacent said first electrically conductive layer and defining an overpressure stop.

23. A microelectronic capacitive transducer according to claim 22 wherein said insulating layer comprises a third diamond layer.

24. A microelectronic capacitive transducer according to claim 19 wherein said signal conditioning means comprises temperature compensation means for generating an output signal substantially independent of ambient temperature variation.

25. A microelectronic capacitive transducer according to claim 19 wherein said first electrically conductive layer, said diaphragm, and said mounting means define a sealed cavity so that the capacitive transducer operates as an absolute pressure sensor.

26. A microelectronic capacitive transducer according to claim 19 further comprising a substrate positioned on a face of said first electrically conducting layer opposite said diaphragm, and wherein said substrate and said first electrically conductive layer have respective aligned openings extending therethrough to define a vented cavity so that the capacitive transducer operates as a differential pressure sensor.

27. A microelectronic capacitive transducer comprising:

a first electrically conductive layer;

a diaphragm positioned opposite said first electrically conductive layer, said diaphragm comprising a first diamond layer having a dopant concentration of greater than about $10^{19}$ cm$^{-3}$ so as to be electrically conducting; and mounting means for mounting said diaphragm so as to be moveable relative to said first electrically conductive layer and defining a cavity therebetween.

28. A microelectronic capacitive transducer according to claim 27 further comprising an insulating layer on a face of said first diamond layer adjacent said first electrically conductive layer and defining an overpressure stop.

29. A microelectronic capacitive transducer according to claim 28 wherein said insulating layer comprises a second diamond layer.

30. A microelectronic capacitive transducer according to claim 27 further comprising a third diamond layer laterally adjacent said first diamond layer and integrally formed therewith, wherein said third diamond layer is semiconducting, and further comprising signal conditioning means formed in said third semiconducting diamond layer for generating an output signal responsive to movement of said diaphragm relative to said first electrically conductive layer.

31. A microelectronic capacitive transducer according to claim 30 wherein said first and third diamond layers comprise highly oriented diamond.

32. A microelectronic capacitive transducer according to claim 30 wherein said signal conditioning means comprises temperature compensation means for generating an output signal substantially independent of ambient temperature variation.

33. A microelectronic capacitive transducer according to claim 27 wherein said first electrically conductive layer, said diaphragm, and said mounting means define a sealed cavity so that the capacitive transducer operates as an absolute pressure sensor.

34. A microelectronic capacitive transducer according to claim 27 further comprising a substrate positioned on a face of said first electrically conducting layer opposite said diaphragm, and wherein said substrate and said first electrically conductive layer have respective aligned openings extending therethrough to define a vented cavity so that the capacitive transducer operates as a differential pressure sensor.

* * * * *